United States Patent [19]
Chua et al.

[11] Patent Number: 5,240,790
[45] Date of Patent: Aug. 31, 1993

[54] LITHIUM-BASED POLYMER ELECTROLYTE ELECTROCHEMICAL CELL

[75] Inventors: David L. Chua, Wayne, Pa.; Hsiu-Ping Lin, Princeton, N.J.

[73] Assignee: Alliant Techsystems Inc., Edina, Minn.

[21] Appl. No.: 29,082

[22] Filed: Mar. 10, 1993

[51] Int. Cl.$^5$ .............. H01M 6/14; H01M 4/50; H01M 4/48
[52] U.S. Cl. .................. 429/190; 429/192; 429/218; 429/224
[58] Field of Search ........... 429/190, 218, 192, 224

[56] References Cited

U.S. PATENT DOCUMENTS

| | | |
|---|---|---|
| 4,804,596 | 2/1989 | Ebner et al. |
| 4,853,304 | 8/1989 | Ebner et al. |
| 4,948,490 | 8/1990 | Venkatasetty ............ 429/192 X |
| 5,037,713 | 8/1991 | Yoshino et al. ............ 429/192 |
| 5,147,739 | 9/1992 | Beard. |
| 5,176,969 | 1/1993 | Miyabayashi et al. ............ 429/212 |

FOREIGN PATENT DOCUMENTS 0035420  3/1980  Japan ..................... 429/190

*Primary Examiner*—John S. Maples
*Attorney, Agent, or Firm*—Haugen and Nikolai

[57] ABSTRACT

A primary or secondary electrochemical cell includes an anode containing lithium when in a charged state, a relatively solid gelled electrolyte system including an amount of polyacrylonitrile (PAN), an amount of solvent and plasticizer that includes γ-butyrolactone (γ-BL) and an amount of lithium electrolyte salt, preferably a combination of $LiAsF_6$ and $LiBF_4$, and a cathode having a cathode active material selected from transition metal oxides and lithium transition metal oxide intercalation compounds.

16 Claims, 3 Drawing Sheets

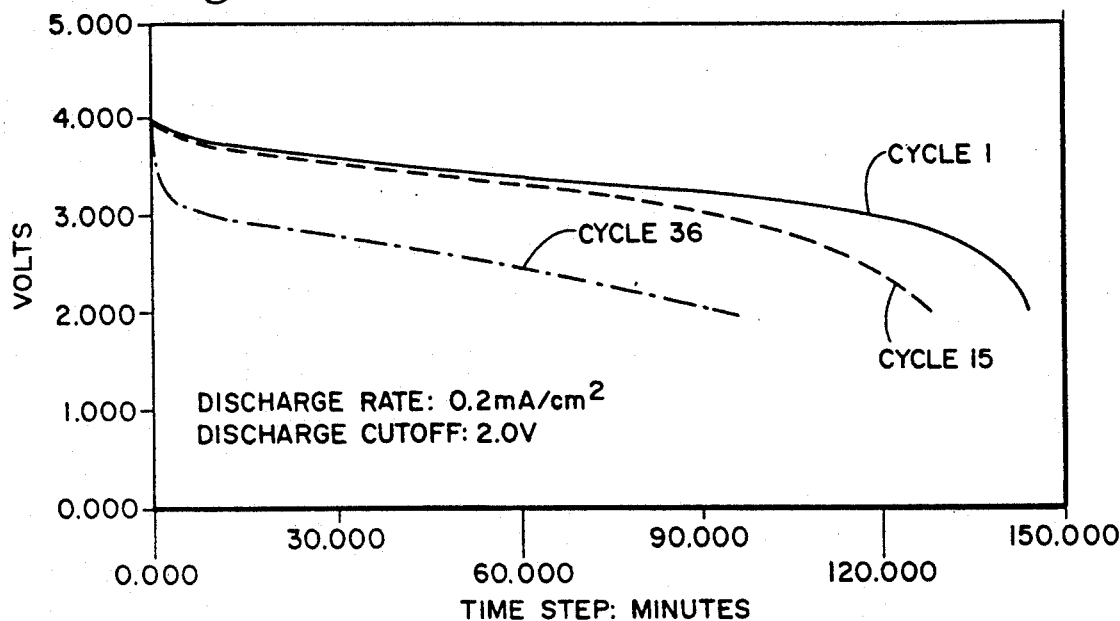
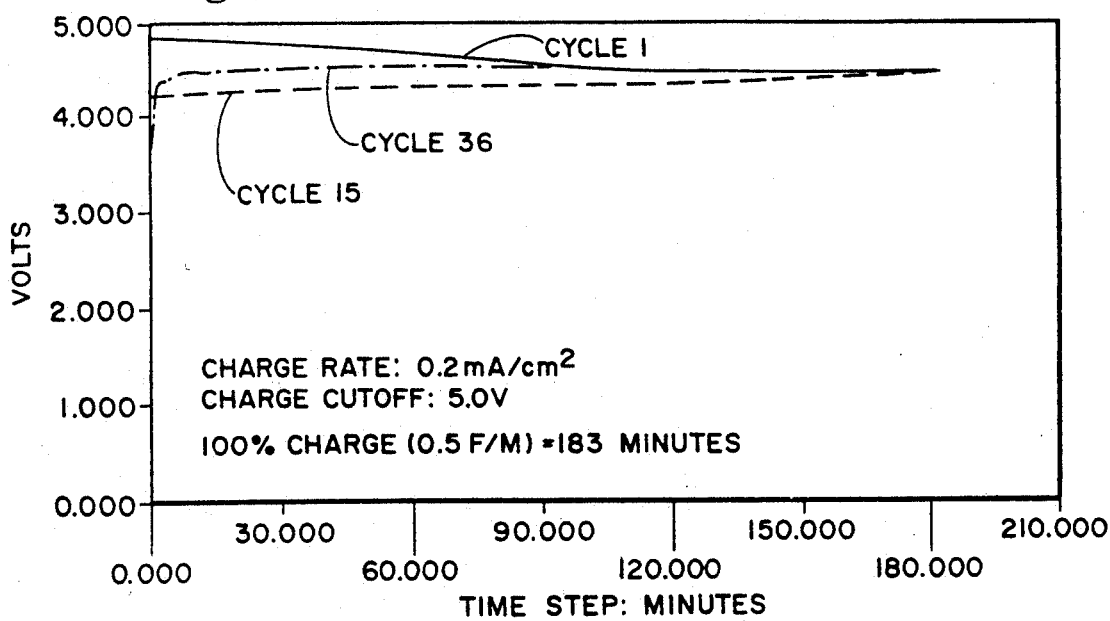

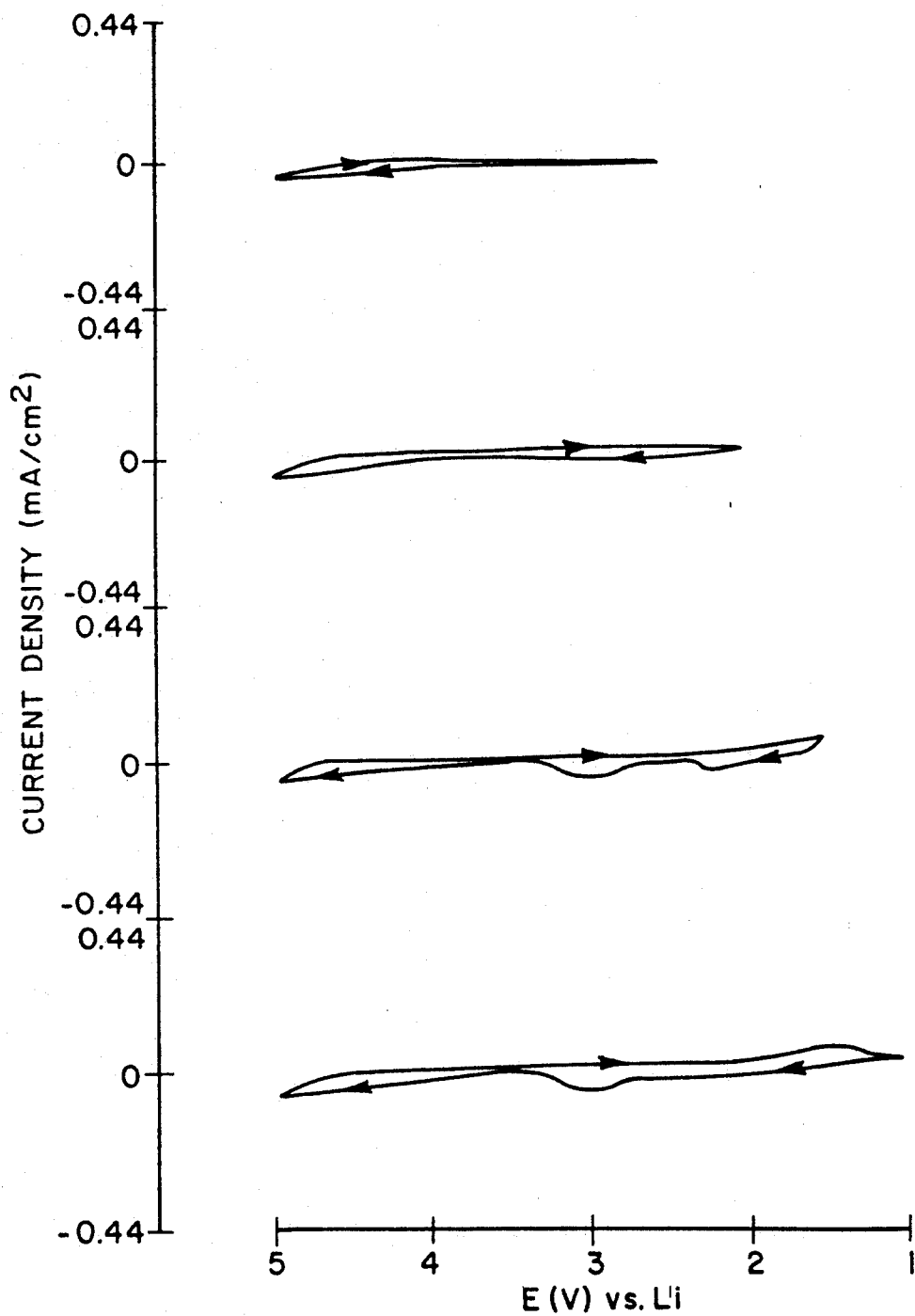
Fig.-4 (CYCLES 1-6)

LITHIUM-BASED POLYMER ELECTROLYTE ELECTROCHEMICAL CELL

BACKGROUND OF THE INVENTION

1. Field of the Invention

The present invention is directed generally to non-aqueous electrochemical cells or batteries of both primary and secondary (rechargeable) types and, more particularly, to a Lithium-based electrochemical cell utilizing a solid polymer electrolyte which has inherent properties that result in operational safety, in addition to high energy density and excellent packaging flexibility. Specifically, the invention involves the formation of a lithium/polymer-based electrochemical cell utilizing a solid gelled film polymeric electrolyte (SPE) system including polyacrylonitrile (PAN) in combination with one or more solvent plasticizers together with one or more lithium salts and, if desired, photoinitiators or crosslinking agents. The electrolyte film is combined with an anode, a composite cathode and current collector in an extremely thin laminar structure and offers configurations of different voltages based on the cathode active material.

2. Related Art

It is known that non-aqueous active metal, particularly lithium, cells have allowed those skilled in the art to achieve much greater energy densities or energy to weight ratios than had been possible with other electrochemical couples. The wide range of potential uses for these cells has led to a great deal of interest in improving the performance and safety of the cells and to develop more reliable primary and secondary or rechargeable cells utilizing these materials. Such cells normally consist of a light, strongly reducing anode, normally an alkali metal such a lithium or a lithium intercalation compound, an aprotic, non-aqueous liquid solvent-/depolarizer into which an appropriate quantity of an electrolyte salt of the anode metal has been dissolved to form a conductive electrolyte solution and an oxidizing agent as the cathode material.

Prior cells using lithium intercalation or insertion compounds as anodes are shown, for example, in U.S. Pat. No. 5,147,739 to Beard, and assigned to the assignee of the present invention, and intercalation materials used for the positive cathode electrodes including $LiCoO_2$, $TiS_2$, $MoS_2$, $V_2O_5$, $V_6O_{13}$ and other such compounds are illustrated in U.S. Pat. No. 4,804,596 to Ebner and Lin (a co-inventor in the present invention) also common of assignee. A further patent, U.S. Pat. No. 4,853,304, also to Ebner and Lin and commonly assigned, discloses an improved non-aqueous electrolyte solution for lithium cells which utilizes an organic-based electrolyte system. That system is one in which an organic ester of formic acid, preferably methyl formate, is combined with an amount of lithium salt and an amount of $CO_2$ to provide improved electrolyte performance, particularly in secondary or rechargeable lithium cells. These cells have been quite successful; however, they all have liquid electrolytes and so uses are limited to applications suitable for cells having liquid electrolyte systems.

More recently, solid polymer electrolytes have been developed for both primary and secondary Li-based cells which utilize thin film polymer-based gelled electrolyte technology to produce cells having a total cell thickness which is typically 8-10 mil (0.02-0.025 cm) and which offer extreme ruggedness and excellent packaging flexibility. Li-based gelled polymer electrolyte cells typically combine a lithium salt and an amount of plasticizer material in a highly viscous polymer matrix which may or may not be further crosslinked.

The utilization of the gelled polymer electrolyte has brought about the development of new concepts in battery technology. The approach is particularly attractive to space applications because of the special features of high energy density and light weight. Until the development of this technology, non-aqueous lithium cells were limited to liquid electrolyte systems that were sensitive to intercell leakage and other problems. In addition to greater flexibility, the solid or semi-solid nature of the Li-based polymer electrolyte cells offers greater safety than conventional liquid electrolyte cells.

The polymer based lithium rechargeable battery technology is faced with key challenges, however, to improve the general characteristics of the polymer electrolyte itself. Conductivity enhancement, especially at low temperature, capacity fading due to interfacial problems between adjacent intracell layers, and the need to reduce or eliminate the degree of anodic passivation due to storage or due to intermittent usage still lie between the known present state of the art and widespread use of such cells for many applications.

SUMMARY OF THE INVENTION

The present invention represents a decided step forward in the art of solid polymer electrolyte cells or batteries. The present invention provides an unique Li-based electrochemical cell of the thin film type including a solid (gelled) polymer electrolyte which offers higher conductivity than known comparable cells together with improved layer interfacial stability. The electrochemical cell of the invention incorporates a novel electrolyte composition combining a base polymer with plasticizers and electrolyte salts. Photoinitiators, particularly UV photoinitiators, and crosslinking agents may be incorporated in certain applications. According to aspects of the invention, the electrochemical cells of the invention may be used in either primary or secondary (rechargeable) versions; they may be single cells or combined in the form of multi-cell batteries. Diverse electrochemical couples, i.e., different cathode active materials, may be employed offering different cell potentials.

In one successful embodiment, the electrolyte is a polyacrylonitrile (PAN)-based gelled polymer system in which the gellacous, relatively solid electrolyte includes an amount of solvent including ethylene carbonate, an amount of plasticizer, preferably including $\gamma$-butyrolactone ($\gamma$-BL), and an amount of a lithium electrolyte salt. In addition to a Li-based electrode, the preferred cathode active material of the cell is a transition metal oxide such as $Li_xCoO_2$ or $Li_2Mn_4O_9$ which has a two-plateau voltage characteristic. That permits the cell to be used either in a 4.0 volt, 3.0 volt mode, or both (with a practical specific energy as high as 946 Wh/kg), when it is used in combination with either Li-based or carbon-based anodes. Other promising cathodes include $V_2O_5$, $V_6O_{13}$ and other lithium complexing transition metal oxides.

The cathode structure is preferably a composite composition which includes the cathode active material, the base or host polymer, the plasticizers, the photoinitiator and crosslinker, if used, and a collector foil. In this manner, the SPE layer can serve as the electrolyte layer, the separator and also be an integral part of a composite cathode. The preferred solvent/plasticizers include γ-butyrolactone in combination with ethylene carbonate (EC) and an amount of polyethylene glycol dimethyl ether (PEGDME). Photoinitiators sensitive to UV radiation together, if desired, with crosslinking agents are utilized to cure the layers and respective interlayer bonds.

The layered structure of a cell is typically about 0.003-0.005 inch (0.0075-0.0125 cm) thick and according to the invention, the particular plasticizer and amount of curing used has been found to greatly affect the integrity of the respective interfacial (interlayer) bonds in the system. The cathode collector substrate material is typically an aluminum foil (0.0025 cm) but may be nickel and/or 300 series stainless steel. Typically, a 304 or 316 stainless steel foil substrate is used with $V_2O_5$ or $V_6O_{13}$. The use of a relatively large amount of γ-butyrolactone in the solvent/plasticizer material has been found to enhance the bulk integrity of the cathode and the bonding with the collector foil as has the use of surface cleaning using such materials as trichloroethylene and acetone further improved the bonding of the composite cathode film to the collector foil.

The Li-based polymer electrochemical cell of the invention combines properties of operational safety due to its relatively solid nature, high energy density, and excellent packaging flexibility. As seen in table I, ambient temperature ionic conductivities as high as $5.6 \times 10^{-3}$ for a PAN-based system using an electrolyte salt combination of $LiAsF_6 + LiBF_4$ and a solvent plasticizer including γ-BL, EC and PEGDME.

The preferred host polymer is polyacrylonitrile (PAN); the preferred solvent/plasticizer system contains γ-butyrolactone, ethylene carbonate and PEGDME. The preferred lithium salts include lithium hexafluoroarsenate ($LiAsF_6$), lithium tetrafluoroborate ($LiBF_4$) and combinations thereof. The preferred cathode active materials include $Li_xCoO_2$ ($0 < x \leq 1.0$), $V_2O_5$, and $Li_2Mn_4O_9$. Photoinitiators include UV sensitive benzophenone, and crosslinking agents such as tetraethylene glycol diacrylate (TEGDA) can also be employed.

BRIEF DESCRIPTION OF THE DRAWINGS

In the drawings, wherein like numerals are utilized to designate like parts throughout the same:

FIG. 2 represents discharge voltage profiles as a function of cycle number of a PAN-based Li/$Li_xCoO_2$ cell after varying numbers of recharge cycles;

FIG. 3 is a graphical representation showing charge profiles as a function of cycle number of a PAN-based lithium/$Li_xCoO_2$ cell in accordance with the invention; and FIG. 4 represents a cyclic voltammogram of a polymer electrolyte configured in accordance with the invention at a sweep rate equal to 50 mV/sec.

DETAILED DESCRIPTION

Figure 1:
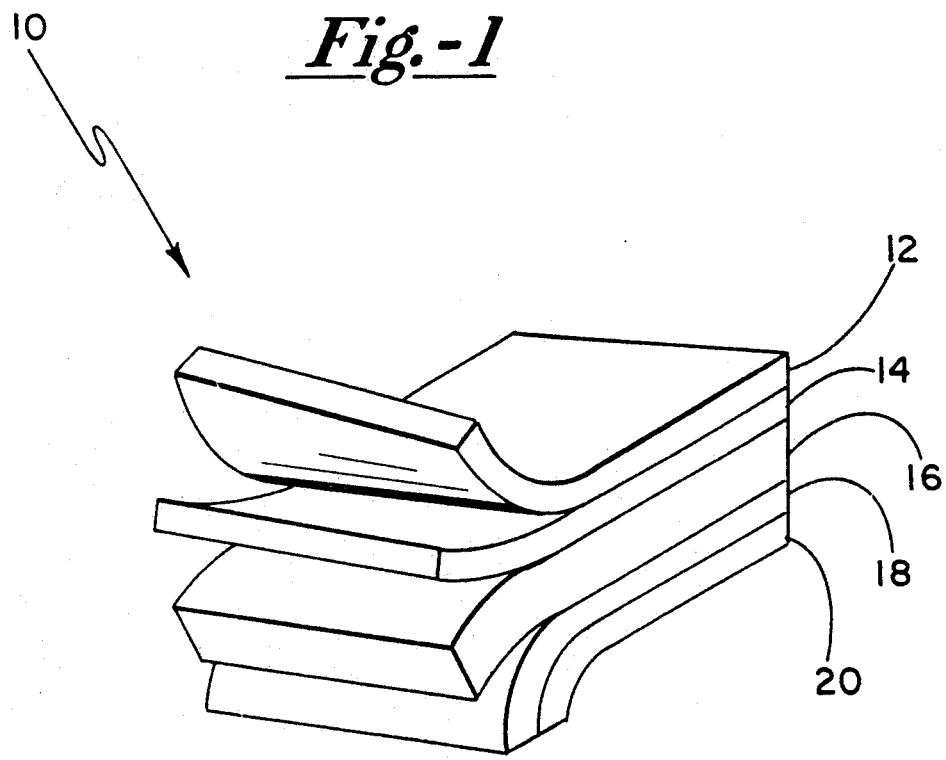
FIG. 1 is a schematic representation in the form of a peeled-back perspective view of a multi-layered structure of a cell in accordance with the present invention.

It will be appreciated that an important aspect of the present invention involves utilizing a combination of materials in a PAN-based electrolyte which enables a higher ionic conductivity to be achieved in the polymer-based electrolyte over a fairly broad temperature range. In addition, the capabilities of processing thin electrolytes with the desired bulk properties while at the same time controlling the properties of electrolyte/electrolyte interfaces has also been improved. Maintaining the integral stability of the sandwich construction is an important consideration with respect to maintaining cell performance over a number of recharge cycles. This involves the characteristic uniformity and homogeneity in the host-polymer layers together with stable interlayer bonding including bonding with the current collector. In this regard, it will be appreciated that various fabrication methods can be employed.

A typical layered cell structure is represented by the enlarged perspective view of FIG. 1, generally at 10, in which the cathode current collector is shown at 12, the composite cathode (positive) active electrode at 14, the electrolyte layer at 16, the lithium anode (negative) electrode material at 18 and anode carrying grid member 20.

In accordance with the invention, it has been found that the following general polymer electrolyte composition range combines the allowable physical workability of the composite system with the best range of physical and electrochemical properties:

Polyacrylonitrile (PAN): 12-22 mole percent (m/o)
γ-butyrolactone (γ-BL): 18-36 m/o
Ethylene carbonate (EC): 33-39 m/o
Polyethylene glycol dimethyloxy ether (PEGDME): 1-15 m/o
Li-salt, e.g., $LiAsF_6$, $LiBF_4$, $LiCF_3SO_3$, $LiN(CF_3SO_2)_2$: 4-16 m/o and, if UV radiation is to be applied, usually an amount of crosslinking agent, e.g., tetraethylene glycol diacrylate (TEGDA) and a photoinitiator selected from:
benzophenone
diphenyl(2,4,6-trimethylbenzoyl)phosphine oxide
benzyl dimethylketol
2-benzyl-2-n,n-dimethylamino-1-(4-morpholinophenyl)-1-1bytanoonexanthone

GENERAL PREPARATION OF POLYMER ELECTROLYTE FILMS

A measured quantity of γ-butyrolactone (γ-BL) and ethylene carbonate (EC) was heated in a beaker to 130° C. in a dry room. A weighted quantity of polyacrylonitrile (PAN) was added with constant stirring until it was completely dissolved. A known quantity of Li-salt was then added followed by a known quantity of polyethylene glycol dimethoxy ether (PEGDME) until the resulting solution was homogenous. If UV radiation was used, a known quantity of photoinitiators was added.

The viscous solution was cast onto a substrate using a drawdown rod. The rod was moved through the solution pool spreading the solution across the substrate. The drawdown rod is a round stainless steel bar tightly wound with stainless steel wire. The diameter of the rod and wire vary in size depending on the film thickness required. The substrate can be any thin foil. In our case, we used 0.0025 cm thick aluminum foil as the substrate. The thickness of finished film is typical in the range of 0.0075 to 0.0125 cm.

In the preparation of composite cathode film, premixed $Li_xCoO_2$ and carbon powder was added into the polymer electrolyte solution mixture prior to casting the film. The composite cathode film was fabricated using the same technique mentioned above. The preferred substrate for composite cathodes using $Li_xCoO_2$ is aluminum or stainless steel foil.

The use of $Li_xCoO_2$ as a cathode material, for example, is advantageous to the SPE system as it is very suitable for reintegration into a polymer-based composite electrode because of the SPE's broader electrochemical stability window compared to the liquid systems and because of the excellent Li diffusivity in the $Li_xCoO_2$ structure. The rate capability of the $Li_xCoO_2$ cathode has also been amply demonstrated. The $Li/Li_xCoO_2$ couple in the liquid-based system has demonstrated that $Li_xCoO_2$ is a highly reversible and rate capable cathode material. With an average >3.9 V operating voltage and reversibility in the lithium content between 0.5 and 1.0, the specific energy density is 533.9 Wh/kg making it also a very good material for solid-state cells.

In accordance with the invention, a polymer electrolyte cell using $Li_xCoO_2$ as a cathode and Li as an anode has been successfully demonstrated over 42 cycles at the charge/discharge rate of 0.2 mA/cm$^2$. The capacity faded gradually to 60% of the initial delivered capacity over the cycles. FIGS. 2 and 3 show the discharge and charge voltage profiles as a function of cycles, respectively. The high initial charge voltage was apparently related to a poor initial interfacial contact. The cell appeared to become polarized as cycles proceeded. This result is generally very encouraging, however, and reveals the rate capability and cyclability of the technology of the invention.

The determination of the voltage range in which the composite polymer electrolyte film is electrochemically stable is an important parameter affecting the performance of the cells of the invention. Electrochemical stability studies of the polymer film were carried out using a three-electrode cell with a platinum foil working electrode, a Li counter electrode and thin strips of Li pressed against nickel wire as the reference electrode. The cyclic voltammogram (CV) of the cell was performed using a PAR 273 potentiostat on the polymer films containing different concentrations of γ-butyrolactone by cycling the films in the potential ranges of 2.5–5.0 V, 2.0 V–5.0 V, 1.5–5.0 V and 1.0–5.0 V versus the lithium reference electrode. The CV results for the polymer film with 14% PAN, 10% LiAsF$_6$, 36% γ-butyrolactone, 39% EC and 1% PEGDME at a sweep rate of 50 mV/sec are shown in FIG. 4. It was found that when the cycling potential was limited to 2.0–5.0 V vs. Li, no polymer film oxidation was observed, indicating the compatibility with 4.0 V $Li/Li_xCoO_2$ system.

The temperature dependence of the PAN-based polymer electrolyte with single salt, LiAsF$_6$, and double salts, LiAsF$_6$+LiBF$_4$, is summarized in Table I. The conductivity variation as a function of temperature was relatively small in the range of −20° C. and 100° C., which is a typical feature of the single phase hybrid film. At temperatures above −20° C., the polymer films exhibited excellent ionic conductivity. However, an abrupt drop in conductivity occurred at −40° C. For the polymer electrolyte film (a) with single salt, LiAsF$_6$, the conductivity increased with temperature, and reached a stable value at 80° C., above which no further increase in conductivity was observed within the temperature range examined. The polymer electrolyte film with double salts (b), LiAsF$_6$+LiBF$_4$, exhibited initial increase of the ionic conductivity up to 60° C., above which further increase in temperature produced a decrease in conductivity.

TABLE I

Temperature's Dependence of Ionic Conductivity of PAN-based Polymer Electrolyte

| Temperature (°C.) | Conductivity (S/cm) | |
|---|---|---|
| | Composition (a) | Composition (b) |
| | PAN - 13% | PAN - 14% |
| | LiAsF$_6$ - 13% | LiAsF$_6$ - 6% |
| | γ-BL - 36% | LiBF$_4$ - 4% |
| | EC - 37% | γ-BL - 36% |
| | PEGDME - 1% | EC - 39% |
| −40 | 5.07 × 10$^5$ | 5.94 × 10$^4$ |
| −20 | 1.51 × 10$^3$ | 2.49 × 10$^3$ |
| 0 | 2.15 × 10$^3$ | 3.64 × 10$^3$ |
| 20 | 2.51 × 10$^3$ | 5.56 × 10$^3$ |
| 40 | 3.01 × 10$^3$ | 6.20 × 10$^3$ |
| 60 | 3.43 × 10$^3$ | 6.27 × 10$^3$ |
| 80 | 3.96 × 10$^3$ | 4.88 × 10$^3$ |
| 100 | 3.96 × 10$^3$ | 4.18 × 10$^3$ |

The $Li/Li_xMn_4O_9$ couple has two voltage plateaus with a wide utilized lithium range. The first plateau is around 4.0 V when lithium concentration (x) is between 0 and 2.0. The cell voltage decreases to 3.0 V when lithium (x) is higher than 2.0 and maintains at the level until lithium concentration reaches 4.4. The commercially available material is $Li_2Mn_4O_9$ which makes the use of this cathode material very unique. The as-built cell can be treated as either fully charged or fully discharged cell depending on the voltage application, as shown in the following equations:

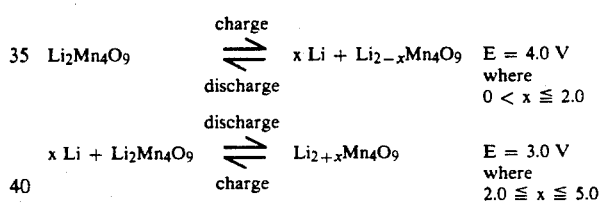

$$Li_2Mn_4O_9 \underset{discharge}{\overset{charge}{\rightleftharpoons}} x\,Li + Li_{2-x}Mn_4O_9 \quad E = 4.0\,V$$
where $0 < x \leq 2.0$ $$x\,Li + Li_2Mn_4O_9 \underset{charge}{\overset{discharge}{\rightleftharpoons}} Li_{2+x}Mn_4O_9 \quad E = 3.0\,V$$
where $2.0 \leq x \leq 5.0$ For a 4.0 V system, the cell needs to be charged prior to use. Preliminary data demonstrates that this cathode material offers even higher operation voltage than $Li_xCoO_2$ cathode and is highly reversible, too. The specific energy density is 520 Wh/kg based on the first discharge, and so $Li_2Mn_4O_9$ is also a desirable or preferred cathode material. When a $Li/Li_2Mn_4O_9$ cell undergoes a discharge first, the operating voltage is in the 3.0 V range with the lithium utilization of 2.0 to 5.0.

$V_2O_5$ is a well-known cathode material with a moderate cell voltage. At 3.2 V cell voltage, the specific energy density is 470 Wh/kg. Liquid-based systems have demonstrated that $V_2O_5$ is highly reversible and rate capable when cycles between 2.8 to 3.7 V. The cells containing this cathode, as manufactured, are in the fully charged state and ready to use.

The 4.0 V cathode candidates are so called lithiated compounds. The use of these materials as cathode materials results in fully discharged cells in the as manufactured state. The cells need to be charged prior to use in order to deliver any useful energy. This disadvantage becomes an advantage when applied to a "rocking-chair" concept in which the anode can be non-lithium compounds. The lithium incorporated in the cathode can be initially transferred to the anode during the charging and vice versa during the discharging. Eliminating the use of pure lithium as the anode will significantly improve cell cyclability and safety.

This invention has been described herein in considerable detail in order to comply with the Patent Statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

We claim:

1. A primary or secondary electrochemical cell comprising: an anode containing lithium when in a charged state;
   a gelled electrolyte system comprising polyacrylonitrile (PAN), plasticizer including γ-butyrolactone (γ-BL) and a lithium electrolyte salt; and
   a cathode comprising a cathode active material selected from the group consisting of transition metal oxides and a lithium transition metal oxide intercalation compound.

2. The electrochemical cell of claim 1 wherein the electrolyte system comprises:
   from about 12 to about 22 mole percent PAN;
   from about 18 to about 36 mole percent γ-BL;
   from about 33 to about 39 mole percent ethylene carbonate (EC); and
   from about 1 to about 15 mole percent polyethylene glycol dimethyl ether (PEGDME).

3. The electrochemical cell of claim 1 wherein the lithium electrolyte salt includes one or more salts selected from the group consisting of $LiAsF_6$, $LiBF_4$, $LiCF_3SO_3$, and $LiN(CF_3SO_2)_2$.

4. The electrochemical cell of claim 2 wherein the lithium electrolyte salt includes one or more salts selected from the group consisting of $LiAsF_6$, $LiBF_4$, $LiCF_3SO_3$, and $LiN(CF_3SO_2)_2$.

5. The electrochemical cell of claim 3 wherein the electrolyte salt comprises amounts of $LiAsF_6$ and $LiBF_4$.

6. The electrochemical cell of claim 4 wherein the electrolyte salt comprises amounts of $LiAsF_6$ and $LiBF_4$.

7. The electrochemical cell of claim 1 wherein the cathode material is selected from $Li_xCoO_2(0<X\leq1.0)$, $V_2O_5$, and $Li_2Mn_4O_9$.

8. The electrochemical cell of claim 2 wherein the cathode material is selected from $Li_xCoO_2(0<X\leq1.0)$, $V_2O_5$, and $Li_2Mn_4O_9$.

9. The electrochemical cell of claim 1 wherein the electrolyte system contains from about 12 to 15 mole percent PAN.

10. The electrochemical cell of claim 2 wherein the electrolyte system contains from about 12 to 15 mole percent PAN.

11. The electrochemical cell of claim 6 wherein the electrolyte system contains from about 12 to 15 mole percent PAN.

12. The electrochemical cell of claim 1 wherein the anode contains no lithium until charged.

13. The electrochemical cell of claim 1 wherein the electrolyte system contains an amount of a UV sensitive photoinitiator.

14. The electrochemical cell of claim 1 wherein the electrolyte is in the form of a thin film.

15. The electrochemical cell of claim 5 wherein the electrolyte is in the form of a thin film.

16. An electrochemical cell comprising:
   an anode and a cathode, the cathode comprising a cathode active mate,
   a relatively solid, thin film polymer-based electrolyte system comprising;
      an amount of polyacrylonitrile,
      an amount of a plasticizer including γ-butyrolactone (γ-BL) and optionally including an amount of a plasticizer selected from the group consisting of ethylene carbonate (EC) and polyethylene glycol dimethyl ether (PEGDME) and mixtures thereof,
      an amount of lithium salts including $LiAsF_6$ and $LiBF_4$; and
   wherein the anode is lithium-based and the cathode active material is selected from transition metal oxides and lithium insertion compounds.

* * * * *

UNITED STATES PATENT AND TRADEMARK OFFICE
CERTIFICATE OF CORRECTION

PATENT NO. : 5,240,790

DATED : August 31, 1993

INVENTOR(S) : David L. Chua et al

It is certified that error appears in the above-identified patent and that said Letters Patent is hereby corrected as shown below:

In column 7, line 14, after ":", the remainder of the paragraph, "an anode containing lithium when in a charged state;", should be indented as per the two following subparagraphs.

In column 7, line 17, after "(PAN),", insert -- a -- .

In column 8, line 30, delete "mate" and insert -- material -- .

Signed and Sealed this

First Day of March, 1994

*Attest:*

BRUCE LEHMAN

*Attesting Officer*   *Commissioner of Patents and Trademarks*